(12) United States Patent
Chen

(10) Patent No.: US 10,113,359 B1
(45) Date of Patent: Oct. 30, 2018

(54) STEADY-STATE GEAR STRUCTURE FOR ROLLER SHADE

(71) Applicant: My Home Global Company, ErShui Township, ChangHua County (TW)

(72) Inventor: Ju-Huai Chen, ErShui Township (TW)

(73) Assignee: My Home Global Company, ErShui Township (TW)

( * ) Notice: Subject to any disclaimer, the term of this patent is extended or adjusted under 35 U.S.C. 154(b) by 0 days.

(21) Appl. No.: 15/788,951

(22) Filed: Oct. 20, 2017

(51) Int. Cl.
| | |
|---|---|
| *F03G 1/00* | (2006.01) |
| *E06B 9/56* | (2006.01) |
| *E06B 9/42* | (2006.01) |
| *F16H 1/20* | (2006.01) |
| *F16H 7/02* | (2006.01) |
| *F16H 33/02* | (2006.01) |
| *F03G 1/02* | (2006.01) |
| *F03G 1/08* | (2006.01) |

(52) U.S. Cl.
CPC .............. *E06B 9/56* (2013.01); *E06B 9/42* (2013.01); *F16H 1/203* (2013.01); *F16H 7/02* (2013.01); *F16H 33/02* (2013.01); *F03G 1/02* (2013.01); *F03G 1/08* (2013.01)

(58) Field of Classification Search
CPC ... F03G 1/02; F03G 1/08; F16H 1/203; F16H 7/02; F16H 33/06; E06B 9/42; E06B 9/56
See application file for complete search history.

(56) References Cited

U.S. PATENT DOCUMENTS

| | | | | |
|---|---|---|---|---|
| 5,531,257 | A * | 7/1996 | Kuhar | E06B 9/32 160/168.1 P |
| 6,330,899 | B1 * | 12/2001 | Ciuca | E06B 9/32 160/170 |
| 6,644,372 | B2 * | 11/2003 | Judkins | E06B 9/32 160/170 |
| 8,245,756 | B2 * | 8/2012 | Cheng | E06B 9/262 160/170 |
| 8,297,332 | B2 * | 10/2012 | Lin | E06B 9/322 160/170 |
| 9,366,076 | B2 * | 6/2016 | Hung | E06B 9/322 |

* cited by examiner

*Primary Examiner* — Phillip A Johnson
(74) *Attorney, Agent, or Firm* — Alan D. Kamrath; Kamrath IP Lawfirm, P.A.

(57) ABSTRACT

A gear structure includes at least one return wheel unit (1) and a power transmission unit (2). The at least one return wheel unit includes a first wheel (12) having a first gear (123), a second wheel (13) having a second gear (133), and a spring (14) mounted between the first wheel and the second wheel. The power transmission unit includes a first driven gear set (22), a second driven gear set (23) and a transmission member (24). The first driven gear set has a third gear (222) and a first bevel gear (223). The third gear meshes with the second gear. The second driven gear set has a second bevel gear (232) meshing with the first bevel gear. The transmission member is connected between the driving member and the second driven gear set.

10 Claims, 10 Drawing Sheets

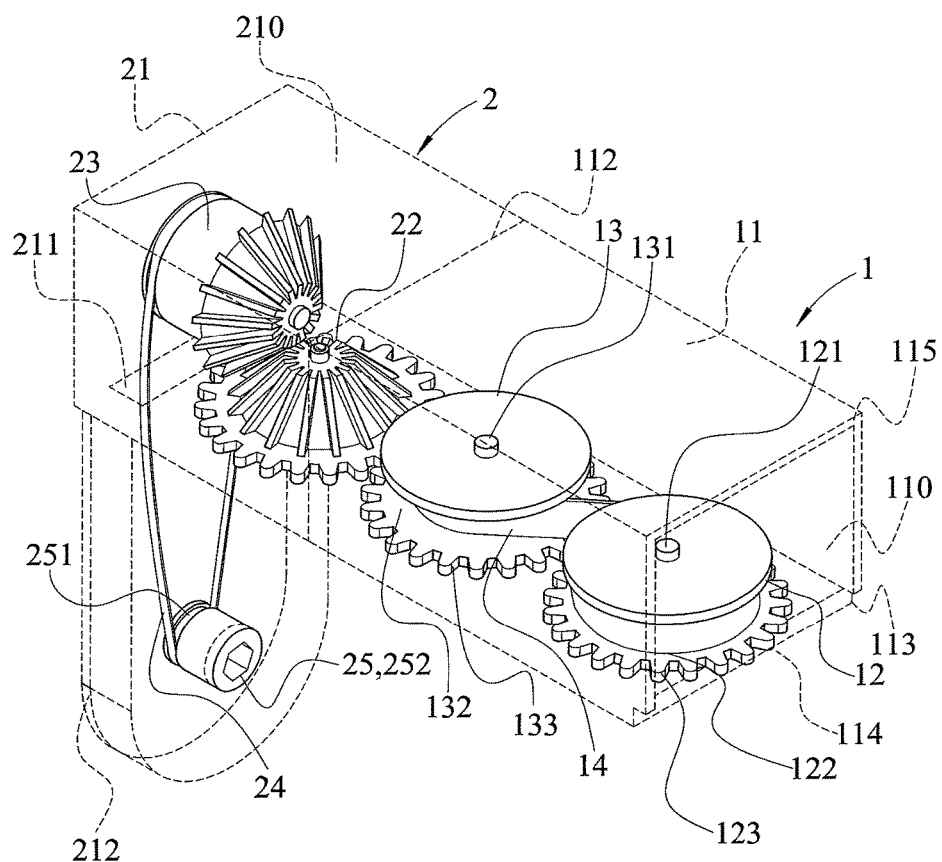
F I G . 1

STEADY-STATE GEAR STRUCTURE FOR ROLLER SHADE

BACKGROUND OF THE INVENTION

1. Field of the Invention

The present invention relates to a gear structure and, more particularly, to a gear structure for a roller shade.

2. Description of the Related Art

A conventional roller shade comprises a transverse mandrel, an elastic return mechanism connected with the transverse mandrel, and a shading face wound around the transverse mandrel. In operation, when the shading face is pulled downward and unwound from the transverse mandrel to reach a determined position, the elastic return mechanism stores a returning force. On the contrary, when the user wishes to wind the shading face, the shading face is rolled upward by the returning force of the elastic return mechanism and wound around the transverse mandrel. However, the elastic return mechanism has a determined torque to overcome the gravity of the roller shade, so that when the roller shade has a heavier weight, the torque of the elastic return mechanism cannot withstand the weight of the roller shade. Thus, the elastic return mechanism is not available for a roller shade with a heavier weight. In addition, the elastic return mechanism is mounted on a side of the roller to provide a torque to drive the roller shade, so that the elastic return mechanism is not operated steadily. Further, the elastic return mechanism is not assembled and disassembled easily and conveniently.

BRIEF SUMMARY OF THE INVENTION

The primary objective of the present invention is to provide a steady-state gear structure functioning as a power return mechanism for a roller shade.

In accordance with the present invention, there is provided a gear structure comprising at least one return wheel unit and a power transmission unit connected with the at least one return wheel unit. The at least one return wheel unit includes a housing, a first wheel mounted in the housing, a second wheel mounted in the housing, and a spring wound around the first wheel and having a distal end secured to the second wheel. The housing has an interior defining a receiving space which has a bottom provided with two fitting portions. The housing has a first side provided with a first passage and a second side provided with a second passage. The first wheel has a center provided with a first shaft rotatably mounted on one of the two fitting portions and has a periphery provided with a first annular groove. The first wheel is provided with a first gear protruding outward from the first passage of the housing. The second wheel has a center provided with a second shaft rotatably mounted on the other one of the two fitting portions and has a periphery provided with a second annular groove. The second wheel is provided with a second gear protruding outward from the second passage of the housing. The spring is wound around the first annular groove of the first wheel. The distal end of the spring is secured to the second annular groove of the second wheel. The power transmission unit includes a side bracket juxtaposed to the housing of the at least one return wheel unit, a first driven gear set mounted in the side bracket, a second driven gear set mounted in the side bracket, a driving member mounted on the side bracket, and a transmission member connected between the driving member and the second driven gear set. The side bracket has an interior defining a receiving chamber which has a bottom provided with a first mounting portion and has a side provided with a second mounting portion. The side bracket has a surface provided with an opening. The side bracket is provided with an extension. The first driven gear set has a center provided with a first spindle rotatably mounted on the first mounting portion of the side bracket. The first driven gear set includes a third gear and a first bevel gear connected with the third gear. The third gear of the first driven gear set meshes with the second gear of the second wheel. The second driven gear set has a center provided with a second spindle rotatably mounted on the second mounting portion of the side bracket. The second driven gear set includes an engaging portion and a second bevel gear connected with the engaging portion. The second bevel gear of the second driven gear set meshes with the first bevel gear of the first driven gear set. The driving member is rotatably mounted on the extension of the side bracket. The driving member has a first end provided with a driving portion engaging the transmission member and a second end provided with a connecting portion. The transmission member is mounted on the extension of the side bracket and extends through the opening of the side bracket. The transmission member engages the engaging portion of the second driven gear set.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 1 is a perspective view of a gear structure in accordance with the preferred embodiment of the present invention.

DETAILED DESCRIPTION OF THE INVENTION

Figure 2:
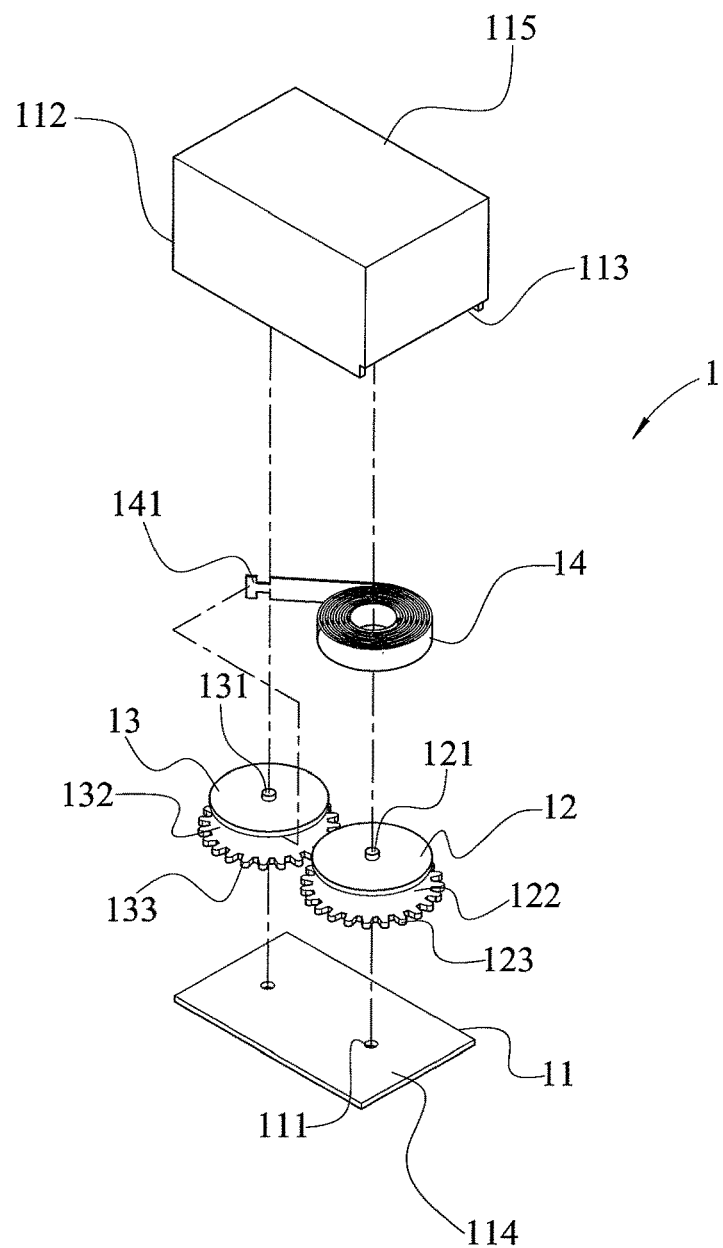
FIG. 2 is an exploded perspective view of a return wheel unit of the gear structure in accordance with the preferred embodiment of the present invention.

Referring to the drawings and initially to FIGS. 1-4, a gear structure in accordance with the preferred embodiment of the present invention comprises at least one return wheel unit 1 and a power transmission unit 2 connected with the at least one return wheel unit 1.

The at least one return wheel unit 1 includes a housing 11, a first wheel 12 mounted in the housing 11, a second wheel 13 mounted in the housing 11, and a spring 14 wound around the first wheel 12 and having a distal end 141 secured to the second wheel 13.

The housing 11 has an interior defining a receiving space 110 which has a bottom provided with two fitting portions 111. The housing 11 has a first side provided with a first passage 113 and a second side provided with a second passage 112.

The first wheel 12 has a center provided with a first shaft 121 rotatably mounted on one of the two fitting portions 111 and has a periphery provided with a first annular groove 122. The first wheel 12 is provided with a first gear 123 protruding outward from the first passage 113 of the housing 11.

The second wheel 13 has a center provided with a second shaft 131 rotatably mounted on the other one of the two fitting portions 111 and has a periphery provided with a second annular groove 132. The second wheel 13 is provided with a second gear 133 protruding outward from the second passage 112 of the housing 11.

The spring 14 is wound around the first annular groove 122 of the first wheel 12, and the distal end 141 of the spring 14 is secured to the second annular groove 132 of the second wheel 13.

The power transmission unit 2 includes a side bracket 21 juxtaposed to the housing 11 of the at least one return wheel unit 1, a first driven gear set 22 mounted in the side bracket 21, a second driven gear set 23 mounted in the side bracket 21, a driving member 25 mounted on the side bracket 21, and a transmission member 24 connected between the driving member 25 and the second driven gear set 23.

The side bracket 21 has an interior defining a receiving chamber 210 which has a bottom provided with a first mounting portion 213 and has a side provided with a second mounting portion 214. The side bracket 21 has a surface provided with an opening 211. The side bracket 21 is provided with an extension 212.

The first driven gear set 22 has a center provided with a first spindle 221 rotatably mounted on the first mounting portion 213 of the side bracket 21. The first driven gear set 22 includes a third gear 222 and a first bevel gear 223 connected with the third gear 222. The third gear 222 of the first driven gear set 22 meshes with the second gear 133 of the second wheel 13.

The second driven gear set 23 has a center provided with a second spindle 231 rotatably mounted on the second mounting portion 214 of the side bracket 21. The second driven gear set 23 includes an engaging portion 233 and a second bevel gear 232 connected with the engaging portion 233. The second bevel gear 232 of the second driven gear set 23 meshes with the first bevel gear 223 of the first driven gear set 22.

The driving member 25 is rotatably mounted on the extension 212 of the side bracket 21. The driving member 25 has a first end provided with a driving portion 251 engaging the transmission member 24 and a second end provided with a connecting portion 252 connected with a roller shade.

The transmission member 24 is mounted on the extension 212 of the side bracket 21 and extends through the opening 211 of the side bracket 21. The transmission member 24 engages the engaging portion 233 of the second driven gear set 23.

In the preferred embodiment of the present invention, the engaging portion 233 of the second driven gear set 23 is an annular groove, the driving portion 251 of the driving member 25 is an annular groove, and the transmission member 24 is a belt mounted between the engaging portion 233 of the second driven gear set 23 and the driving portion 251 of the driving member 25.

In another preferred embodiment of the present invention, the engaging portion 233 of the second driven gear set 23 is a toothed face, the driving portion 251 of the driving member 25 is a toothed face, and the transmission member 24 is a toothed belt mounted between the engaging portion 233 of the second driven gear set 23 and the driving portion 251 of the driving member 25.

In the preferred embodiment of the present invention, the first gear 123 of the first wheel 12 is located under the first annular groove 122. The second gear 133 of the second wheel 13 is located under the second annular groove 132. The spring 14 is preferably a volute spiral blade spring and has a determined rewinding force. The spring 14 is arranged between the first wheel 12 and the second wheel 13 in two different directions to form a substantially S-shaped winding. The extension 212 of the side bracket 21 extends downward and located under the opening 211. The first bevel gear 223 of the first driven gear set 22 is located above the third gear 222.

In the preferred embodiment of the present invention, the housing 11 of the at least one return wheel unit 1 includes a bottom plate 114 and a cover 115 combined with the bottom plate 114.

In the preferred embodiment of the present invention, the bottom plate 114 and the cover 115 of the housing 11 are combined by screwing, locking or adhering.

In the preferred embodiment of the present invention, the side bracket 21 of the power transmission unit 2 includes a base 215 and a cap 216 combined with the base 215.

In the preferred embodiment of the present invention, the base 215 and the cap 216 of the side bracket 21 are combined by screwing, locking or adhering.

In another preferred embodiment of the present invention, the gear structure comprises a plurality of return wheel units 1 connected serially. In assembly, the second gear 133 of the second wheel 13 of one of the return wheel units 1 meshes with the first gear 123 of the first wheel 12 of another one of the return wheel units 1.

Figure 3:
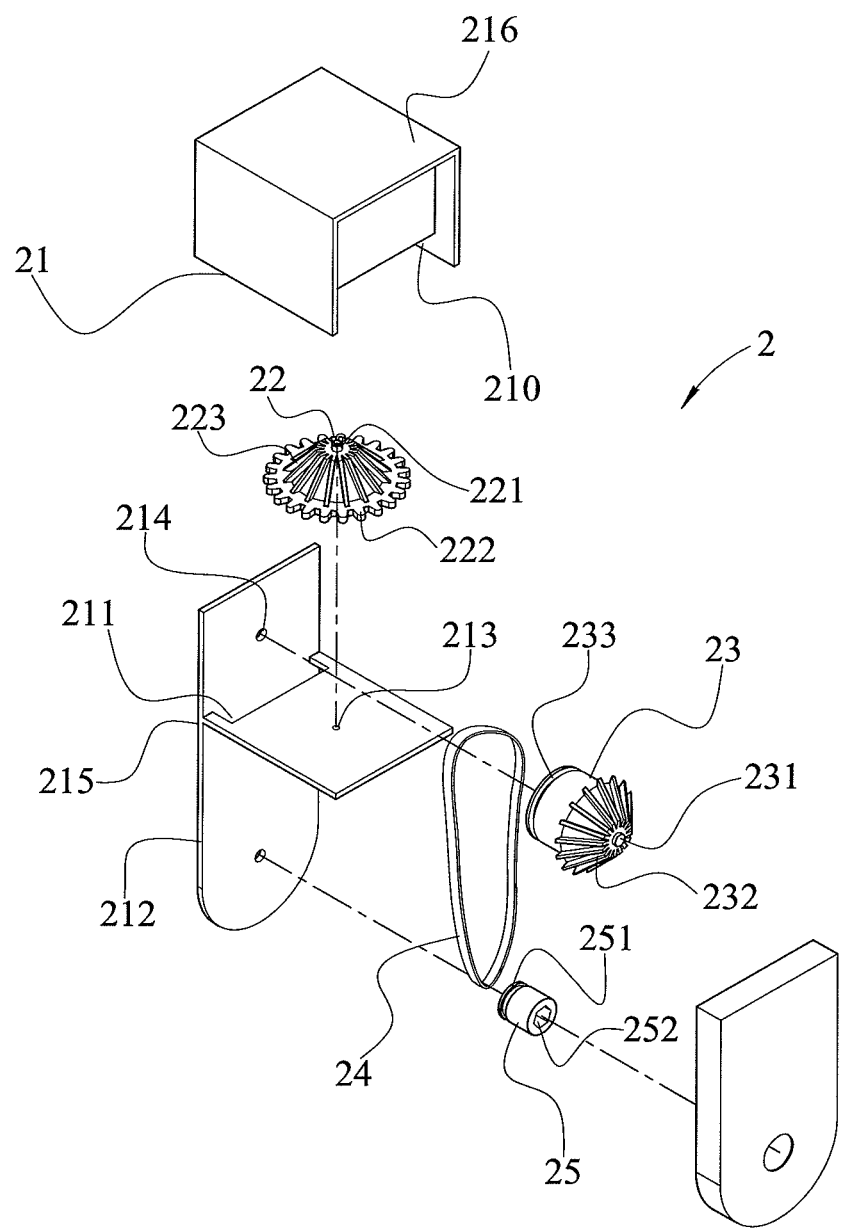
FIG. 3 is an exploded perspective view of a power transmission unit of the gear structure in accordance with the preferred embodiment of the present invention.
Figure 4:
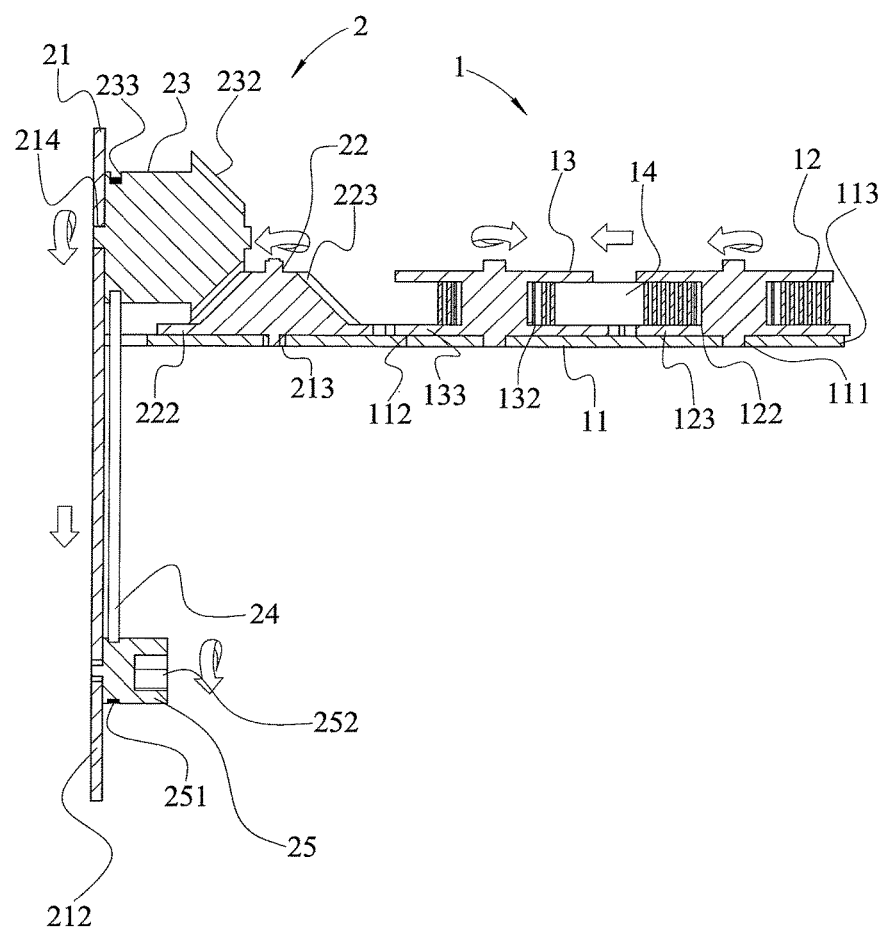
FIG. 4 is a cross-sectional operational view of the gear structure as shown in FIG. 1.
Figure 5:
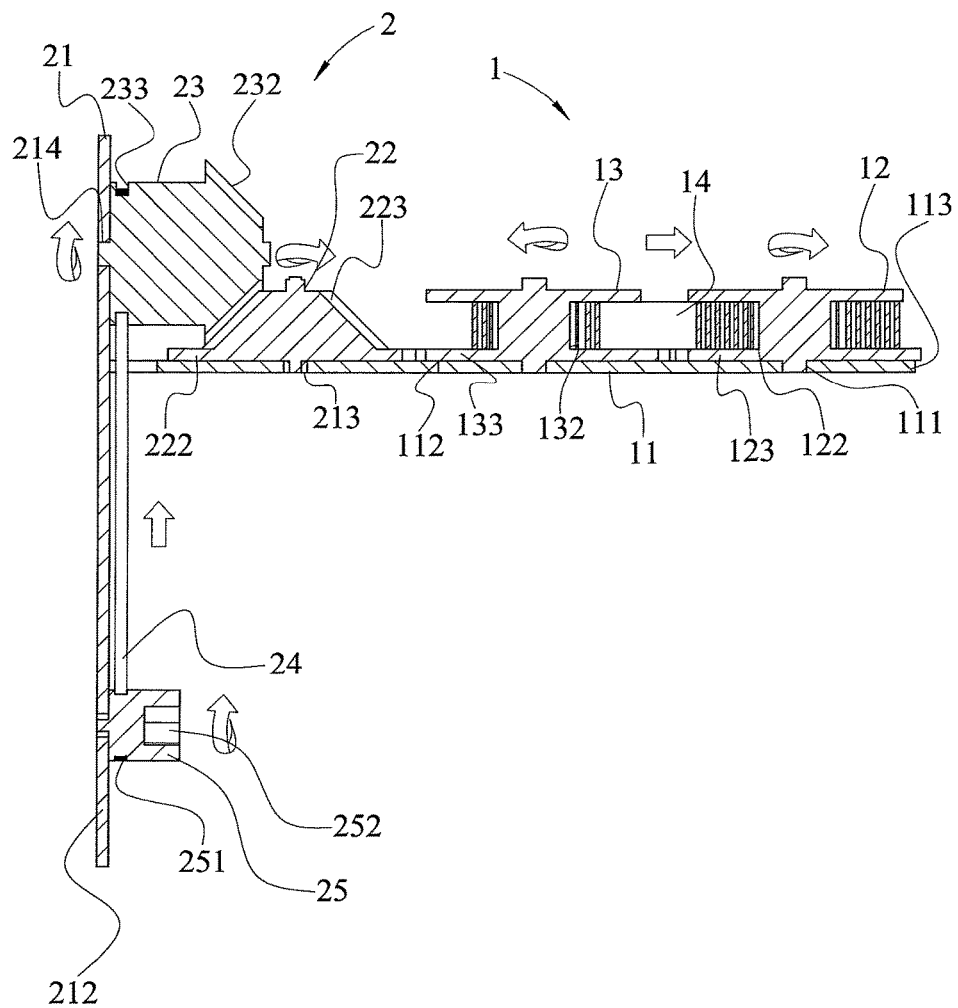
FIG. 5 is another cross-sectional operational view of the gear structure as shown in FIG. 1.

In operation, referring to FIGS. 4 and 5 with reference to FIGS. 1-3, the first wheel 12 is rotatably mounted on one of the two fitting portions 111, the second wheel 13 is rotatably mounted on the other one of the two fitting portions 111, and the spring 14 is wound around the first wheel 12, with the distal end 141 of the spring 14 being secured to the second wheel 13. In such a manner, when the second wheel 13 is rotated in a determined direction, the distal end 141 of the spring 14 is pulled by rotation of the second wheel 13 to wind the spring 14 around the second wheel 13 and to unwind the spring 14 from the first wheel 12, so as to restore a returning torque.

The first driven gear set 22 is rotatably mounted on the first mounting portion 213 of the side bracket 21, and the second driven gear set 23 is rotatably mounted on the second mounting portion 214 of the side bracket 21 and is perpendicular to the first driven gear set 22. In such a manner, the second bevel gear 232 of the second driven gear set 23 meshes with the first bevel gear 223 of the first driven gear set 22, so as to change the direction of rotation. The third gear 222 of the first driven gear set 22 meshes with the second gear 133 of the second wheel 13, so that the torque produced by the at least one return wheel unit 1 is transmitted by the second gear 133 of the second wheel 13 and the third gear 222 of the first driven gear set 22. The transmission member 24 is mounted between the engaging portion 233 of the second driven gear set 23 and the driving portion 251 of the driving member 25. The roller shade includes a transverse mandrel combined with the connecting portion 252 of the driving member 25 and a shading face mounted on the transverse mandrel. In such a manner, when the shading face of the roller shade is lowered, the transverse mandrel of the roller shade is rotated in one direction as shown in FIG. 4 to drive the driving member 25 which is rotated to drive the transmission member 24 which rotates the second driven gear set 23 which rotates the first driven gear set 22 which rotates the second wheel 13 which pulls the spring 14 which rotates the first wheel 12, so that the spring 14 is unwound from the first wheel 12, so as to restore a returning torque. On the contrary, when the shading face of the roller shade is lifted, the first wheel 12 is rotated by the returning torque, and the spring 14 is wound around the first wheel 12, to rotate the second wheel 13 which rotates the first driven gear set 22 which rotates the second driven gear set 23 which drives the transmission member 24 which rotates the driving member 25 which rotates the transverse mandrel of the roller shade in the other direction as shown in FIG. 5, so as to lift the shading face of the roller shade. Thus, the power transmission unit 2 transmits the power so that the shading face of the roller shade is lifted and lowered steadily and stably.

In practice, the gear structure is mounted on a side of the roller shade to function as a torsion device for winding the roller shade. When the roller shade is pulled downward, the power transmission unit 2 transmits the power, and the at least one return wheel unit 1 restores the returning torque. When the roller shade is rolled upward, the returning torque of the at least one return wheel unit 1 aids the upward rolling of the roller shade. In such a manner, the roller shade is wound and unwound smoothly and conveniently by operation of the power transmission unit 2.

Figure 6:
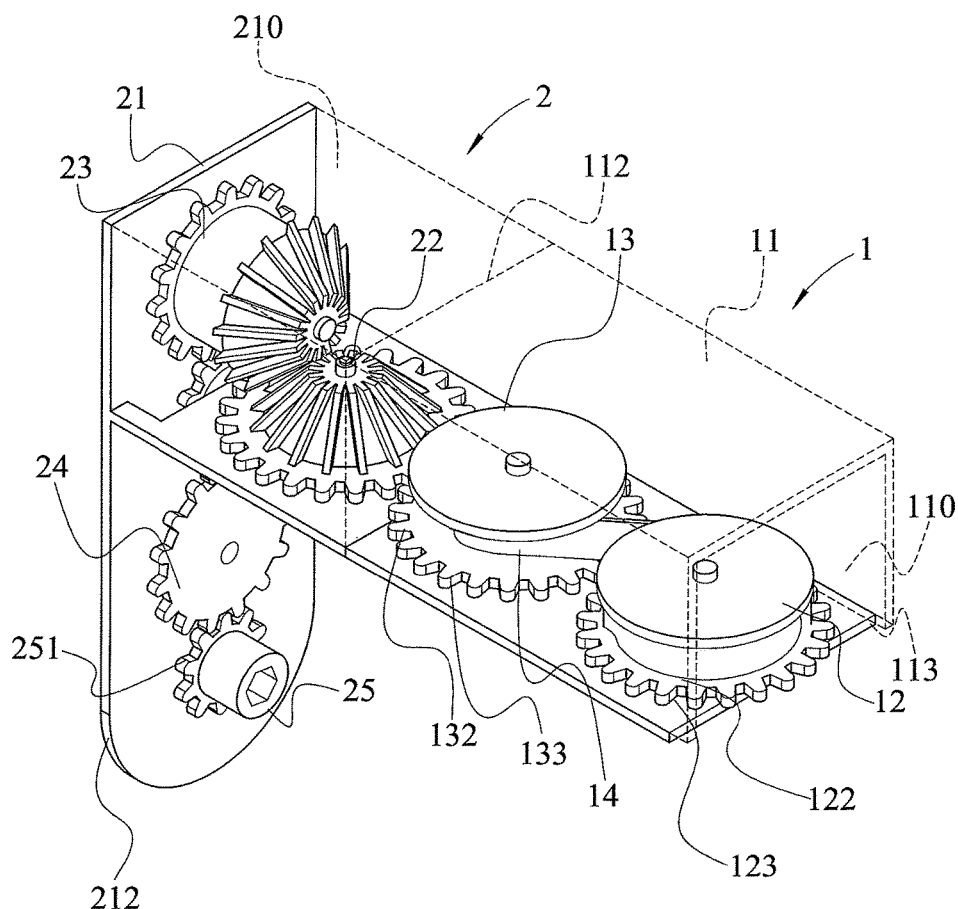
FIG. 6 is a perspective view of a gear structure in accordance with another preferred embodiment of the present invention.

As shown in FIG. 6, the engaging portion 233 of the second driven gear set 23 is a gear, the driving portion 251 of the driving member 25 is a gear, and the transmission member 24 includes a plurality of gears intermeshing the engaging portion 233 of the second driven gear set 23 and the driving portion 251 of the driving member 25.

Figure 7:
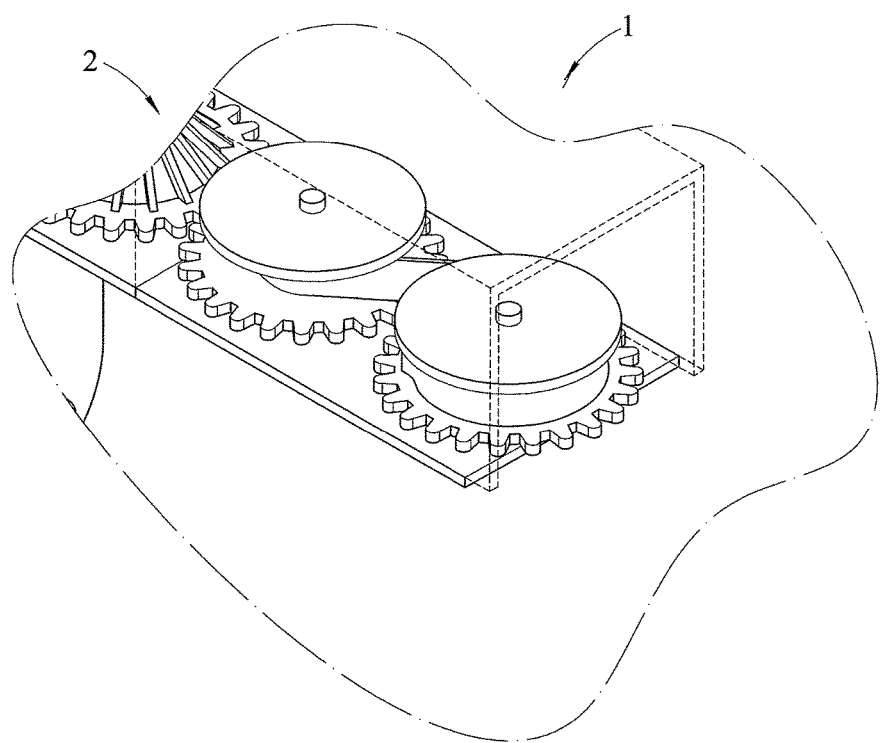
FIG. 7 is a partially perspective view showing the gear structure having a single return wheel unit.
Figure 8:
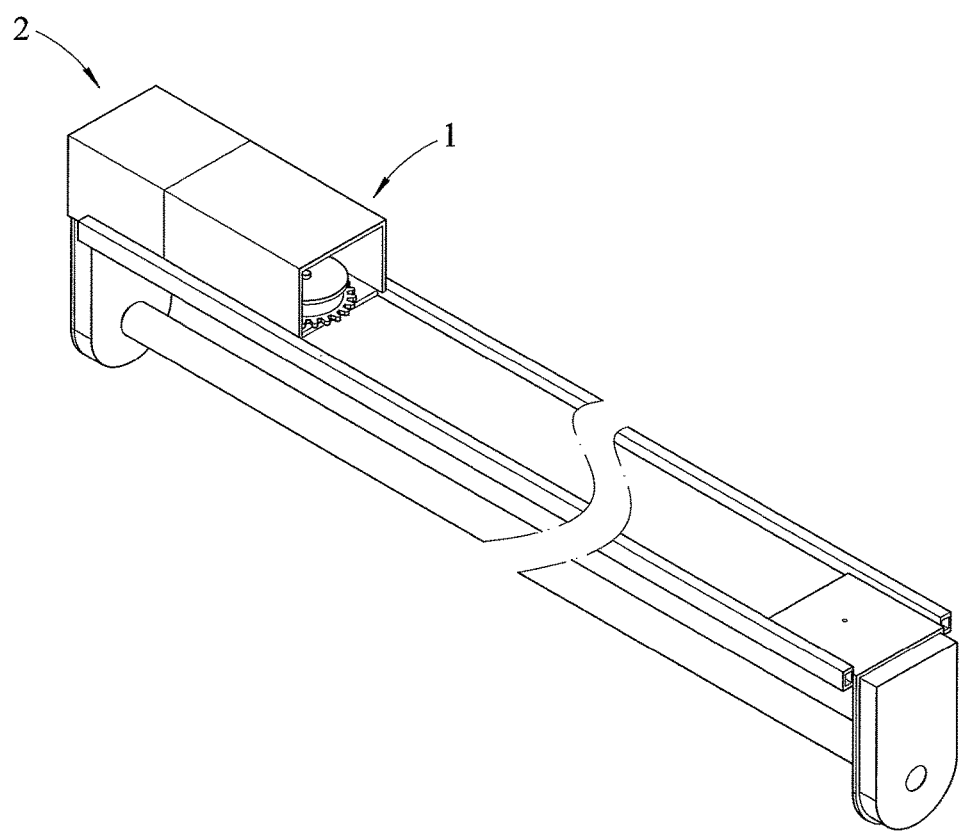
FIG. 8 is a perspective view showing the gear structure having a single return wheel unit for a roller shade.

Referring to FIGS. 7 and 8, the gear structure comprises a single return wheel unit 1. The return wheel unit 1 has a determined torque. When the roller shade has a heavier weight, the number of the return wheel unit 1 is increased to enhance the whole torque to withstand the gravity of the roller shade.

Figure 9:
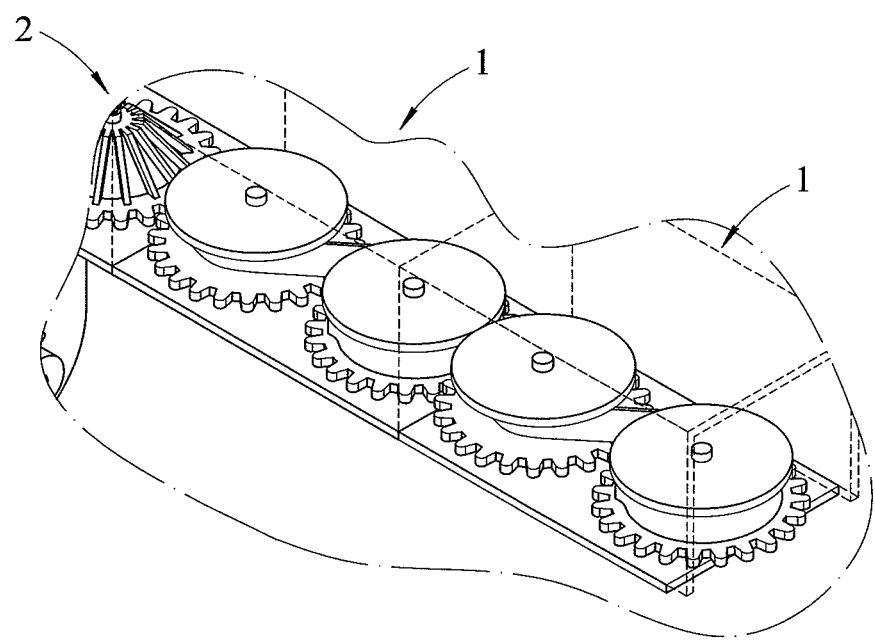
FIG. 9 is a partially perspective view showing the gear structure having a plurality of return wheel units.
Figure 10:
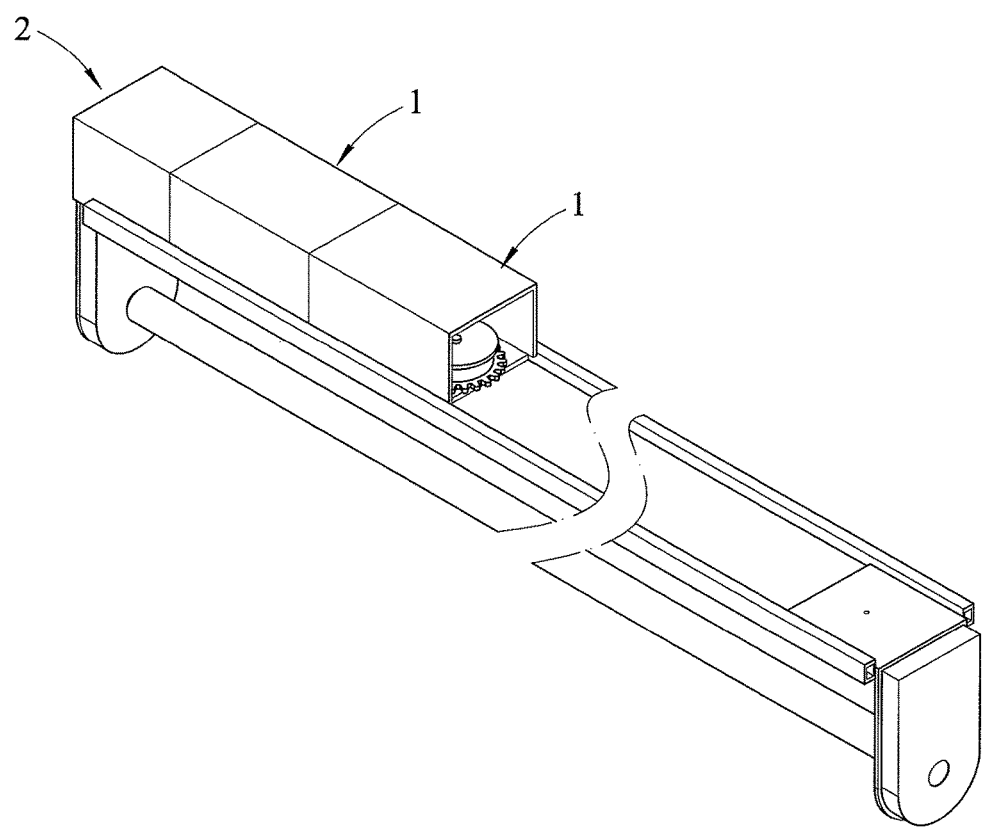
FIG. 10 is a perspective view showing the gear structure having a plurality of return wheel units for a roller shade.

Referring to FIGS. 9 and 10 with reference to FIGS. 1-3, the gear structure comprises a plurality of return wheel units 1 connected serially. At this time, the first gear 123 of the first wheel 12 of each of the return wheel units 1 protrudes outward from the first passage 113 of the housing 11, and the second gear 133 of the second wheel 13 of each of the return wheel units 1 protrudes outward from the second passage 112 of the housing 11. In assembly, the first gear 123 of the first wheel 12 of one of the return wheel units 1 meshes with the second gear 133 of the second wheel 13 of another one of the return wheel units 1. In such a manner, the return wheel units 1 are connected successively, so that when one of the return wheel units 1 is rotated, another one of the return wheel units 1 is also rotated. Thus, the torque values of the springs 14 of the return wheel units 1 are accumulated to increase the total torque of the gear structure. Therefore, when the return wheel units 1 are connected serially, the total torque of the gear structure is regulated to fit roller shades of different kinds and weights, so that the gear structure does not need to provide torque devices of different specifications. In addition, the power transmission unit 2 transmits the power so that the gear structure is operated more conveniently.

Accordingly, the first gear 123 of the first wheel 12 of one of the return wheel units 1 meshes with the second gear 133 of the second wheel 13 of another one of the return wheel units 1, so that the return wheel units 1 are connected successively, to increase the total torque of the gear structure. In addition, the return wheel units 1 are connected serially to regulate the total torque of the gear structure so that the gear structure is available for roller shades of different kinds and specifications. Further, the power transmission unit 2 transmits the power so that the gear structure is operated steadily and stably. Further, the user only needs to change the number of the return wheel units 1 to fit roller shades of different weights, without having to replace the gear structure. Further, the gear structure is assembled and disassembled easily and conveniently.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A gear structure comprising:
at least one return wheel unit (1); and
a power transmission unit (2) connected with the at least one return wheel unit;
wherein:
the at least one return wheel unit includes a housing (11), a first wheel (12) mounted in the housing, a second wheel (13) mounted in the housing, and a spring (14) wound around the first wheel and having a distal end (141) secured to the second wheel;
the housing has an interior defining a receiving space (110) which has a bottom provided with two fitting portions (111);
the housing has a first side provided with a first passage (113) and a second side provided with a second passage (112);
the first wheel has a center provided with a first shaft (121) rotatably mounted on one of the two fitting portions and has a periphery provided with a first annular groove (122);
the first wheel is provided with a first gear (123) protruding outward from the first passage of the housing;
the second wheel has a center provided with a second shaft (131) rotatably mounted on the other one of the two fitting portions and has a periphery provided with a second annular groove (132);
the second wheel is provided with a second gear (133) protruding outward from the second passage of the housing;
the spring is wound around the first annular groove of the first wheel;
the distal end of the spring is secured to the second annular groove of the second wheel;
the power transmission unit includes a side bracket (21) juxtaposed to the housing of the at least one return wheel unit, a first driven gear set (22) mounted in the side bracket, a second driven gear set (23) mounted in the side bracket, a driving member (25) mounted on the side bracket, and a transmission member (24) connected between the driving member and the second driven gear set;

the side bracket has an interior defining a receiving chamber (210) which has a bottom provided with a first mounting portion (213) and has a side provided with a second mounting portion (214);

the side bracket has a surface provided with an opening (211);

the side bracket is provided with an extension (212);

the first driven gear set has a center provided with a first spindle (221) rotatably mounted on the first mounting portion of the side bracket;

the first driven gear set includes a third gear (222) and a first bevel gear (223) connected with the third gear;

the third gear of the first driven gear set meshes with the second gear of the second wheel;

the second driven gear set has a center provided with a second spindle (231) rotatably mounted on the second mounting portion of the side bracket;

the second driven gear set includes an engaging portion (233) and a second bevel gear (232) connected with the engaging portion;

the second bevel gear of the second driven gear set meshes with the first bevel gear of the first driven gear set;

the driving member is rotatably mounted on the extension of the side bracket;

the driving member has a first end provided with a driving portion (251) engaging the transmission member and a second end provided with a connecting portion (252);

the transmission member is mounted on the extension of the side bracket and extends through the opening of the side bracket; and the transmission member engages the engaging portion of the second driven gear set.

2. The gear structure of claim 1, wherein the engaging portion of the second driven gear set is an annular groove, the driving portion of the driving member is an annular groove, and the transmission member is a belt mounted between the engaging portion of the second driven gear set and the driving portion of the driving member.

3. The gear structure of claim 2, wherein the engaging portion of the second driven gear set is a toothed face, the driving portion of the driving member is a toothed face, and the transmission member is a toothed belt mounted between the engaging portion of the second driven gear set and the driving portion of the driving member.

4. The gear structure of claim 1, wherein the engaging portion of the second driven gear set is a gear, the driving portion of the driving member is a gear, and the transmission member includes a plurality of gears intermeshing the engaging portion of the second driven gear set and the driving portion of the driving member.

5. The gear structure of claim 1, wherein:
the first gear of the first wheel is located under the first annular groove;
the second gear of the second wheel is located under the second annular groove;
the spring is a volute spiral blade spring and has a determined rewinding force;
the spring is arranged between the first wheel and the second wheel in two different directions to form a substantially S-shaped winding;
the extension of the side bracket extends downward and located under the opening; and
the first bevel gear of the first driven gear set is located above the third gear.

6. The gear structure of claim 1, wherein the housing of the at least one return wheel unit includes a bottom plate (114) and a cover (115) combined with the bottom plate.

7. The gear structure of claim 6, wherein the bottom plate and the cover of the housing are combined by screwing, locking or adhering.

8. The gear structure of claim 1, wherein the side bracket of the power transmission unit includes a base (215) and a cap (216) combined with the base.

9. The gear structure of claim 8, wherein the base and the cap of the side bracket are combined by screwing, locking or adhering.

10. The gear structure of claim 1, wherein:
the gear structure comprises a plurality of return wheel units connected serially; and
the second gear of the second wheel of one of the return wheel units meshes with the first gear of the first wheel of another one of the return wheel units.

* * * * *